United States Patent
Menheere

(10) Patent No.: US 11,698,024 B1
(45) Date of Patent: Jul. 11, 2023

(54) SYSTEM AND METHOD OF ANTI-ICING INLET GUIDE VANES

(71) Applicant: PRATT & WHITNEY CANADA CORP., Longueuil (CA)

(72) Inventor: David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/662,673

(22) Filed: May 10, 2022

(51) Int. Cl.
*F02C 7/047* (2006.01)

(52) U.S. Cl.
CPC .................................. *F02C 7/047* (2013.01)

(58) Field of Classification Search
CPC ...................................................... F02C 7/047
See application file for complete search history.

(56) References Cited

U.S. PATENT DOCUMENTS

| | | | |
|---|---|---|---|
| 3,123,283 A | | 3/1964 | Leis |
| 3,262,636 A | * | 7/1966 | Palfreyman ............. F02C 7/047 415/115 |
| 5,795,128 A | | 8/1998 | Eichstadt |
| 7,055,304 B2 | | 6/2006 | Courtot et al. |
| 10,443,497 B2 | | 10/2019 | Schenk |
| 10,598,191 B2 | | 3/2020 | Scholtes et al. |
| 2013/0259638 A1 | * | 10/2013 | Suciu ........................ F02C 7/32 415/117 |
| 2017/0328379 A1 | * | 11/2017 | Scholtes ............... F04D 29/544 |
| 2017/0335715 A1 | * | 11/2017 | Youssef .................. F02C 7/047 |

* cited by examiner

*Primary Examiner* — Jacob M Amick
*Assistant Examiner* — Charles J Brauch
(74) *Attorney, Agent, or Firm* — Norton Rose Fulbright Canada LLP

(57) ABSTRACT

An inlet guide vane assembly for an aircraft engine includes an array of inlet guide vanes having radially inner ends at a radially inner shroud, radially outer ends at a radially outer shroud, and airfoils extending therebetween. An internal passage extends radially through the airfoil from a vane air inlet at the radially inner end to a vane air outlet at the radially outer end. The vane air inlet is in fluid communication with an inner plenum, disposed radially inwardly of the inlet guide vane and in fluid communication with an anti-icing air source. The vane air outlet in fluid communication with an outer plenum, disposed radially outwardly of the inlet guide vane and having an exhaust port. A vane anti-icing pathway is defined in a radially-outward direction from the inner plenum, through the internal passage of the vane, and into the outer plenum.

20 Claims, 5 Drawing Sheets

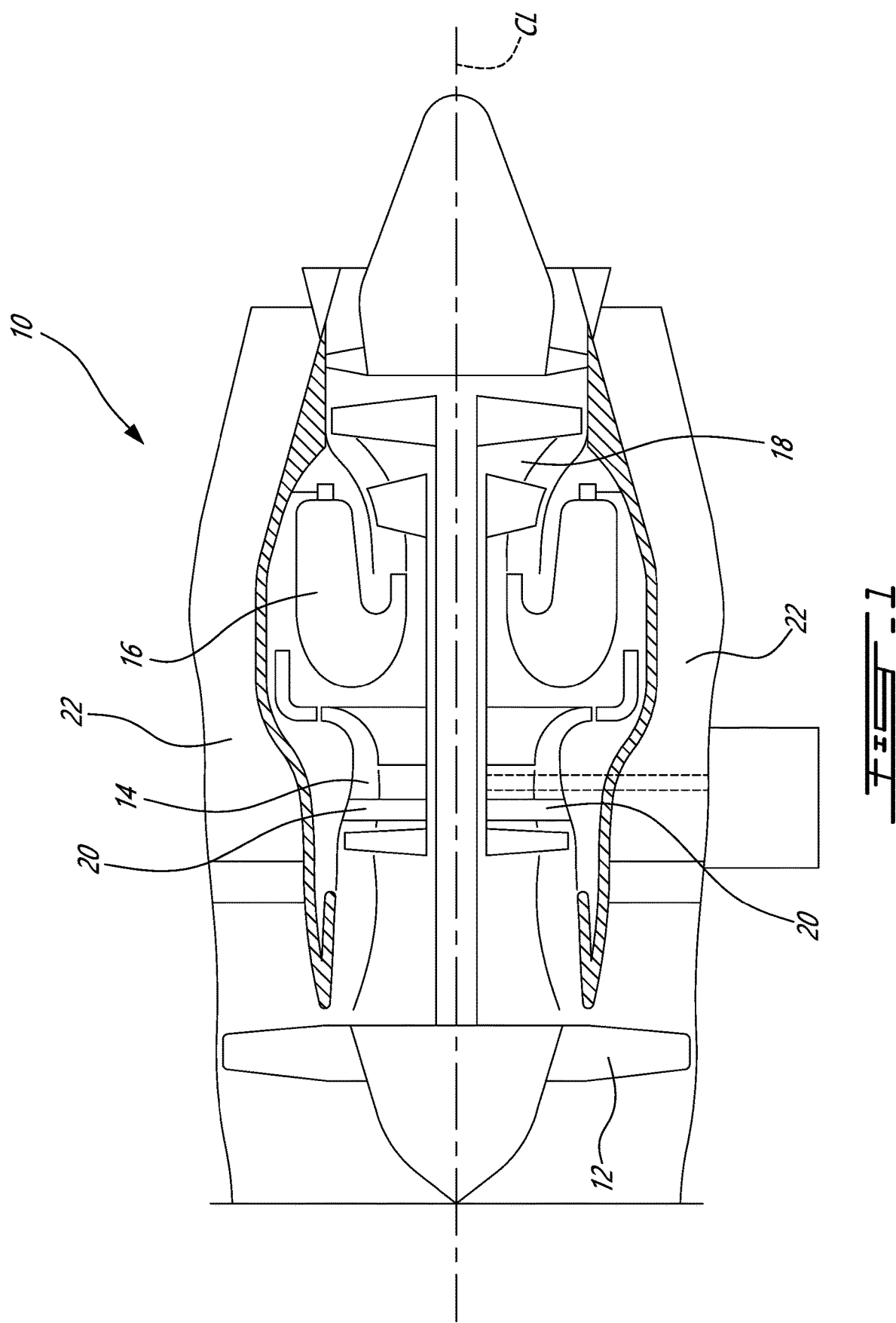

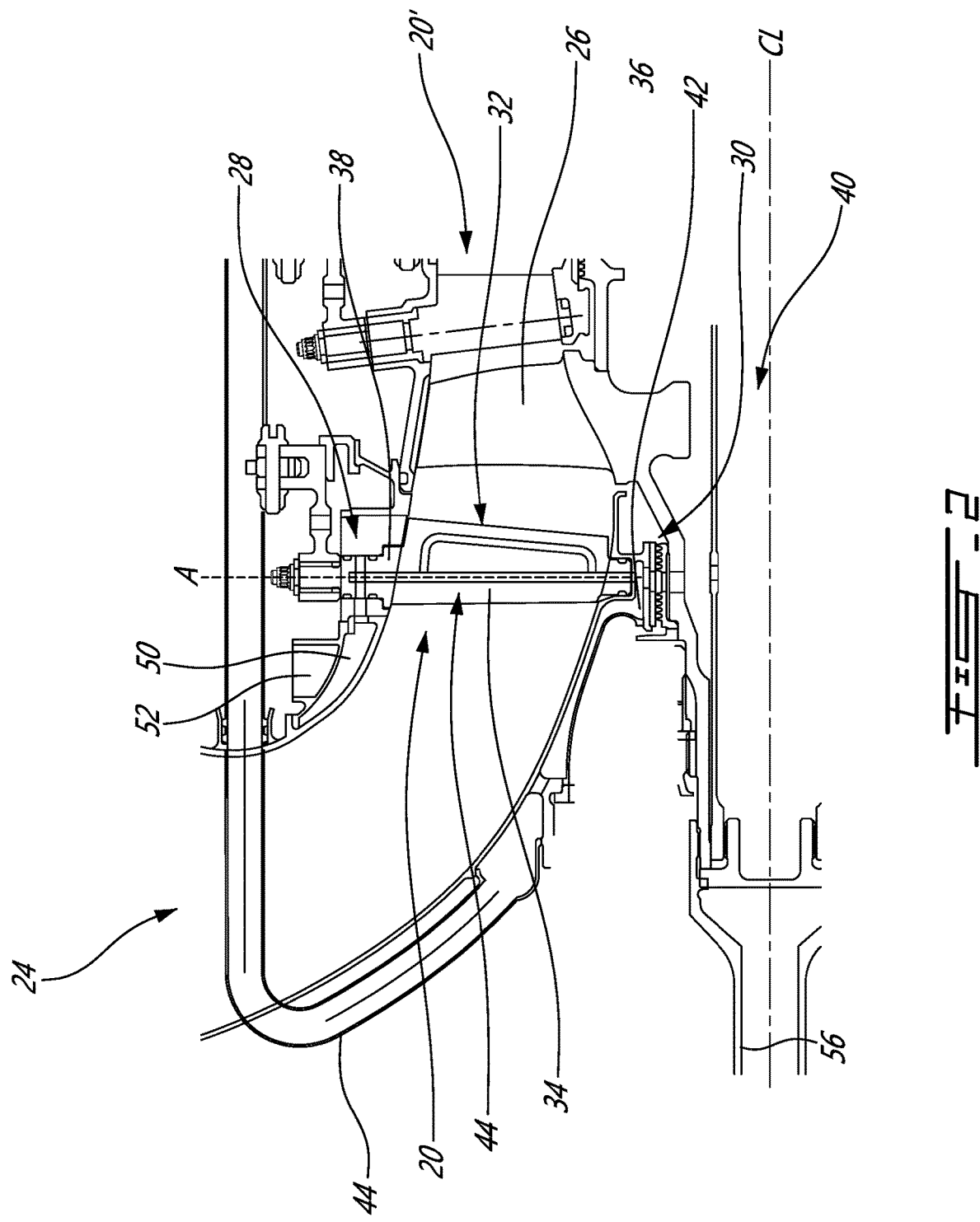

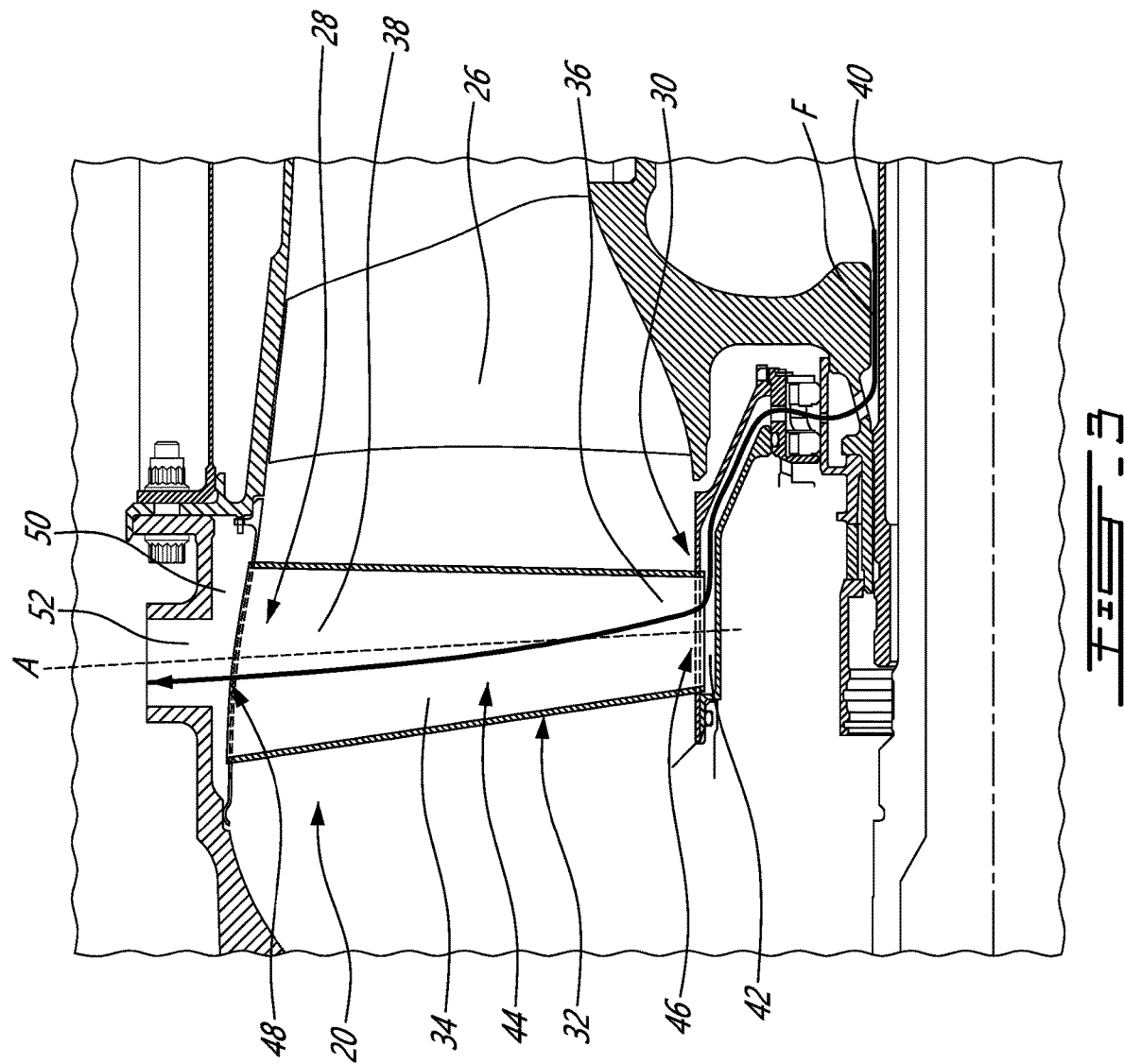

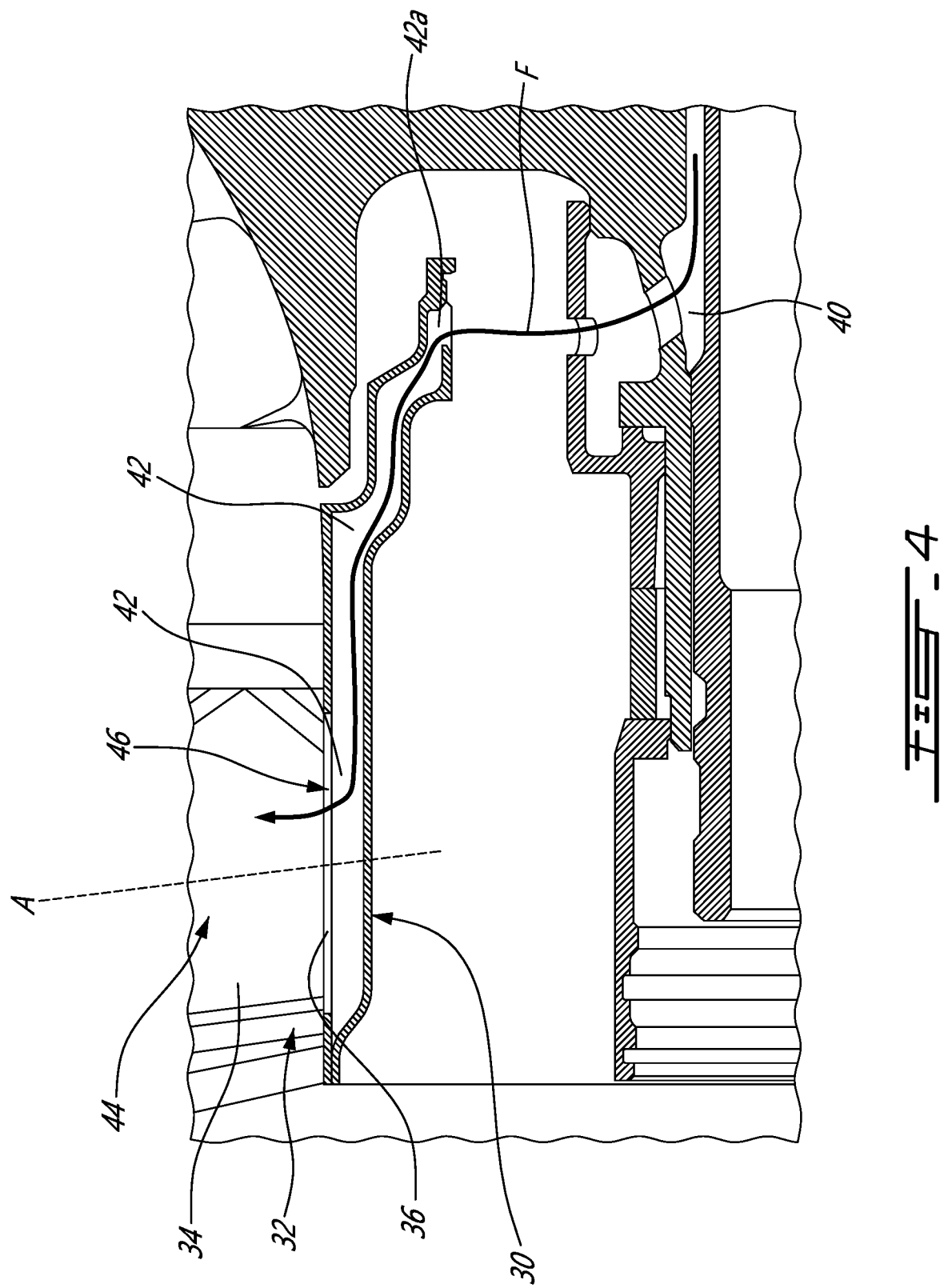

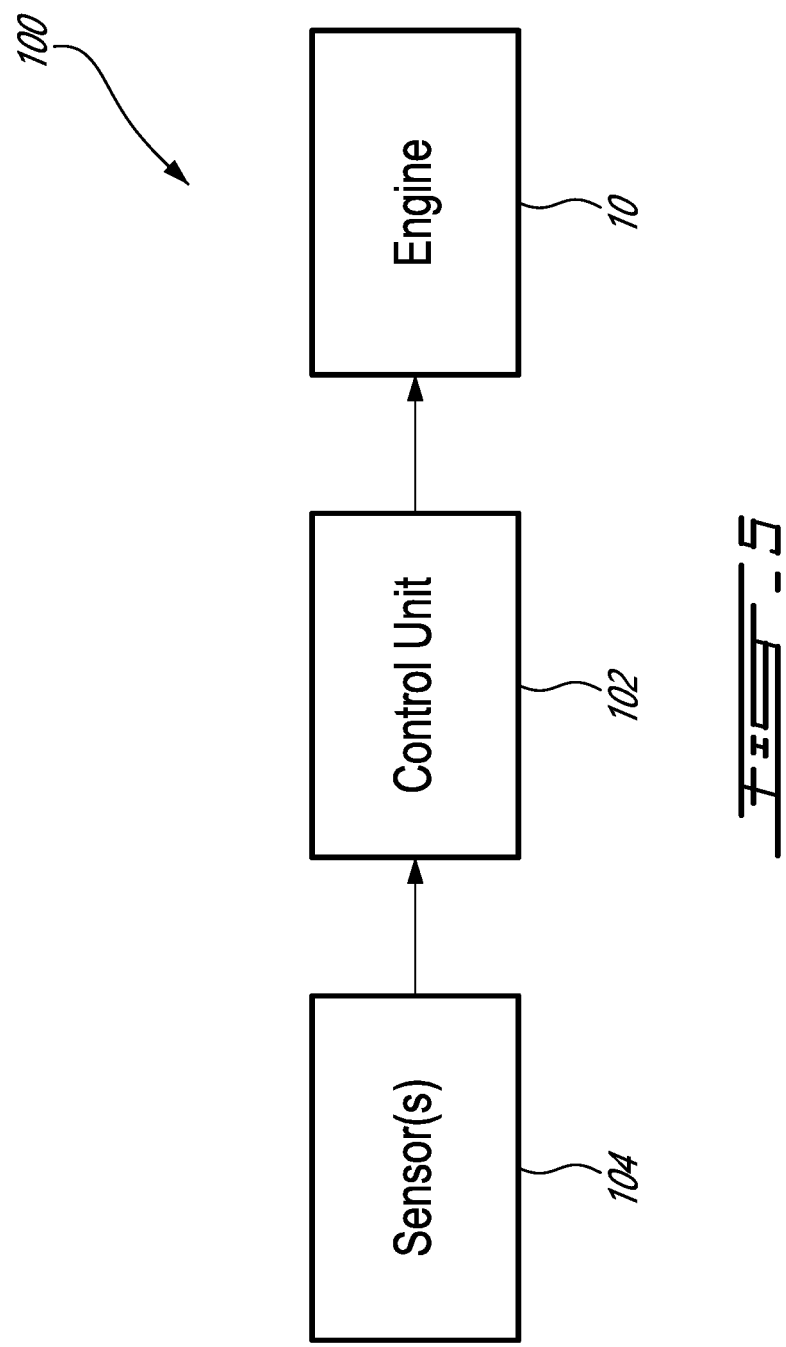

US 11,698,024 B1

SYSTEM AND METHOD OF ANTI-ICING INLET GUIDE VANES

TECHNICAL FIELD

The disclosure relates generally to aircraft engines and, more particularly, to anti-icing of vanes in aircraft engines.

BACKGROUND

Certain aircraft engines include Inlet Guide Vanes (IGVs) located upstream of a first compressor rotor within the air inlet of the engine. These IGVs may be either fixed or may be variable IGVs that can be pivoted about respective airfoil axes as required to direct airflow into the engine.

Because these IGVs are directly exposed to the incoming cold air entering the engine, anti-icing of the IGVs is required during flight to prevent ice formation and/or buildup on the surfaces of the vanes. This anti-icing of IGVs is typically accomplished by ducting warm air, which may be bled from the compressor further downstream, outside of the engine casing back to the radially outer ends of the IGVs. This warm anti-icing air, once it has been used to heat the IGVs, gets exhausted back into the main gas path of the engine and thus gets ingested back into the engine.

While suitable for their intended purposes, improved ant-icing systems for compressor vanes are desired.

SUMMARY

There is accordingly provided an inlet guide vane assembly for an aircraft engine, comprising: an array of inlet guide vanes extending between a radially inner shroud and a radially outer shroud; and an inlet guide vane of the array of inlet guide vanes having a radially inner end at the radially inner shroud, a radially outer end at the radially outer shroud, and an airfoil extending between the radially inner end and the radially outer end, the inlet guide vane having an internal passage extending radially through the airfoil from a vane air inlet at the radially inner end to a vane air outlet at the radially outer end, the vane air inlet in fluid communication with an inner plenum disposed radially inwardly of the inlet guide vane, the inner plenum in fluid communication with an anti-icing air source, the vane air outlet in fluid communication with an outer plenum disposed radially outwardly of the inlet guide vane and having an exhaust port; wherein a vane anti-icing pathway is defined in a radially-outward direction from the inner plenum, through the internal passage of the vane and into the outer plenum.

There is also provided an aircraft engine, comprising: a compressor section having a compressor inlet, a radially inner shroud, a radially outer shroud, and a compressor rotor; an anti-icing air source; an inlet guide vane radially disposed between the radially inner shroud and the radially outer shroud and located upstream of the compressor rotor in the compressor section, the inlet guide vane having a radially inner end at the radially inner shroud, a radially outer end at the radially outer shroud, and an airfoil extending between the radially inner end and the radially outer end, the inlet guide vane having an internal passage extending radially through the airfoil from a vane air inlet at the radially inner end to a vane air outlet at the radially outer end; an inner plenum disposed radially inwardly of the inlet guide vane, the inner plenum in fluid communication with the internal passage via the vane air inlet and with the anti-icing air source; and an outer plenum disposed radially outwardly of the inlet guide vane, the outer plenum in fluid communication with the internal passage via the vane air outlet, the outer plenum having an exhaust port.

There is further provided a method for anti-icing an inlet guide vane in an aircraft engine, comprising: directing hot anti-icing air from an inner plenum disposed radially inwardly of the inlet guide vane through a vane air inlet at a radially inner end of the inlet guide vane; directing the hot anti-icing air in a radially-outward direction through an internal passage within the inlet guide vane, from the vane air inlet at the radially inner end of the inlet guide vane towards a vane air outlet at a radially outer end of the inlet guide vane; directing the hot anti-icing air through the vane air outlet at the radially outer end of the inlet guide vane into an outer plenum disposed radially outwardly of the inlet guide vane; and exhausting the hot anti-icing air from the outer plenum via an exhaust port.

BRIEF DESCRIPTION OF THE DRAWINGS

Reference is now made to the accompanying figures in which:

FIG. 1 is a schematic cross sectional view of a gas turbine engine;

FIG. 2 is schematic cross sectional view of a compressor section with a vane anti-icing system according to an embodiment;

FIG. 3 is an enhanced view of the compressor section of FIG. 2;

FIG. 4 is a further enhanced view of the compressor section of FIG. 2; and FIG. 5 is a block diagram of a control system for a vane anti-icing system according to an embodiment.

DETAILED DESCRIPTION

FIG. 1 illustrates an aircraft engine 10 of a type preferably provided for use in subsonic flight. The aircraft engine 10 in this case is a gas turbine engine, generally comprising in serial flow communication, along a centerline CL, a fan 12 through which ambient air is propelled, a compressor section 14 for pressurizing the air, a combustor 16 in which the compressed air is mixed with fuel and ignited for generating an annular stream of hot combustion gases, and a turbine section 18 including at least one turbine for extracting energy from the combustion gases. Engine 10 may comprise vane assembly(ies) 20. Vane assembly(ies) 20 may be disposed in the multistage compressor 14 in a core section of engine 10. Bypass duct 22 may define an annular passage (e.g. gas path) for some of the airflow through engine 10 to bypass the core section of engine 10. Although gas turbine engine 10 is illustrated as a turbofan engine, it is understood that the devices, assemblies and methods described herein could also be used in conjunction with other types of gas turbine engines such as, for example, turboshaft and/or turboprop engines, as well as hybrid aircraft engines.

FIG. 2 shows an axial cross-section view of engine 10 specifically showing an inlet 24 to compressor section 14, with vane assembly(ies) 20 disposed adjacent compressor rotor blade 26. Vane assembly(ies) 20 are illustratively disposed upstream of a first compressor rotor 26 and may thus be referred to as inlet guide vane (IGV) assemblies. Illustratively, additional vane assembly(ies) 20' may be disposed downstream of a first compressor rotor 26 as well. Compressor rotor 26 includes a plurality of compressor blades and is configured to rotate and compress air as it flows towards combustor 16. Inlet guide vane assembly(ies) 20 may be used to direct a stream of air towards the compressor rotor 26 to be compressed in compressor section 14. Inlet guide vane assembly(ies) 20 may be disposed upstream of a relatively low pressure (e.g. boost) section of compressor 14. In the shown case, engine 10 is a two spool engine and compressor blade(s) 26 form part of a low pressure compressor of the compressor section 14. The proximity of vane assembly(ies) 20 to the inlet 24, and thus their exposure to the ambient air, may contribute to the need for anti-icing of the vane assembly(ies) 20. Other configurations may be contemplated as well.

Referring additionally to FIG. 3, vane assembly(ies) 20 may comprise a radially outer shroud 28, a radially inner shroud 30 and a vane 32. The outer shroud 28 may, for example, include a radially outer casing of compressor section 14. The outer shroud 28 may comprise multiple pieces. The inner shroud 30 may, for example, include a radially inner casing of compressor section 14. Similar to the outer shroud 28, the inner shroud 30 may also be provided in multiple pieces. Vane(s) 32, for instance arranged as an array of vanes 32, may include airfoil(s) or airfoil-shaped body(ies) 34, radially outer end portion(s) 36 and radially inner end portion(s) 38, with the airfoil-shaped body(ies) 34 extending between the radially inner end portion(s) 38 and the radially outer end portion(s) 36. Vane(s) 32 are disposed between the radially outer shroud 28 and radially inner shroud 30 and may be used to direct a stream of air towards the compressor blade(s) 26. Vane(s) 32 may be stationary or fixed. Alternatively, vane(s) 32 may be variable or pivotable about an axis A extending along a length of the vane 32 between the outer shroud 28 and the inner shroud 30. In such cases, vane(s) 32 may be referred to as a variable inlet guide vane(s) (VIGV's).

Referring additionally to FIG. 4, the engine 10 includes a system for heating the vane assembly(ies) 20, also referred to as a vane anti-icing system. A flow of hot anti-icing air F from the engine 10, for instance bleed air from compressor section 14, is directed through the vane(s) 32 in a radially-outward direction to prevent ice build-up on the vane(s) 32. The temperature of the hot anti-icing air F may vary, but is warm enough to prevent ice formation on the vane assembly(ies) 20 and/or defrost vane assembly(ies) if any ice has already built up thereon. A vane heating (or anti-icing) pathway extends from a heated air source 40, for instance the engine core, into a radially inner plenum 42 disposed radially inwardly of the vane(s) 32. The pathway then leads an internal passage 44 enclosed by the airfoil-shaped body(ies) 34 of the vanes) 32 and extending radially through the vane(s) 32, entering and exiting the vane(s) via a vane air inlet 46 at the inner end portion(s) 36 and a vane air outlet 48 at the outer end portion(s) 38. By extending radially through the vane(s) 32, it is understood that the internal passage 44 extends from the radially inner end portion 36 to the radially outer end portion 38 in what may or may not be a perfectly radial direction. For instance, in some cases the internal passage 44 may be aligned in a straight, radial direction through the vane 32. In other cases, the internal passage may define a sinusoidal or other curved path through the vane 32.

In an embodiment, the internal passage 44 is a single passageway bored or otherwise formed through a solid airfoil-shaped body(ies) 34 of the vane(s) 32. In other cases, the airfoil-shaped body(ies) 34 of the vane(s) 32 may be hollow, and the internal passage 44 may occupy an entire hollow inner cavity of the vane(s) 32. Other internal passages 44 through the vane(s) 32 may be contemplated. For example, two or more internal passages may be bored or otherwise formed through a solid airfoil-shaped body(ies) 34 of the vane(s) 32. The heating pathway then leads to a radially outer plenum 50 disposed radially outwardly of the vane(s) 32, the radially outer plenum 50 having an exhaust port 52.

The vane anti-icing system may thus include a vane (or vanes) 32 radially disposed between radially inner shroud 30 and radially outer shroud 28. The vane 32 has a radially inner end 36 at the radially inner shroud 30, a radially outer end 38 at the radially outer shroud 28, and an airfoil 34 extending between the radially inner end 36 and the radially outer end 38. The vane 32 has an internal passage 44 extending through the airfoil 34 from a vane air inlet 46 at the radially inner end 36 to a vane air outlet 48 at the radially outer end 38. The vane air inlet 46 is in fluid communication with an inner plenum 42 disposed radially inwardly of the vane 32. The inner plenum is further in fluid communication with an anti-icing air source 40. The vane air outlet 48 is in fluid communication with an outer plenum 50 disposed radially outwardly of the vane 32 and has an exhaust port 52. A vane anti-icing pathway is defined through the inner plenum 42, the internal passage 44 and the outer plenum 50 in a radially-outward direction.

The inner plenum 42 may be formed in the inner shroud 30 adjacent the inner end portion(s) 36 of vane(s) 32. In an embodiment, the inner plenum 42 is annular and extends about a circumference of the inner shroud 30. In such a case, the inner plenum 42 may provide hot anti-icing air F to each of the vanes(s) 32. Alternatively, multiple inner plenums 42 may be positioned circumferentially-adjacent one another along a circumference of the inner plenum 42. For instance, each of the multiple inner plenums 42 may provide hot anti-icing air F to adjacently-disposed respective one or more vane(s) 32. The inner plenum(s) 42 may include an inner plenum inlet 42a through which hot anti-icing air F may enter from, for instance, the engine core. The hot anti-icing air F then may pass through the inner plenum(s) 42 and enter the vane(s) 32 through the vane air inlet(s) 46 at the inner end portion(S) 36 of vane(s) 32. In some embodiments, inner plenum inlet 42a may include a valve (not shown) for controlling the flow of hot anti-icing air F into the inner plenum(s) 42.

The outer plenum 50 may be formed in the outer shroud 28 adjacent the outer end portion(s) 38 of the vane(s) 32. In an embodiment, the outer plenum 50 is annular and extends about a circumference of the outer shroud 28. In such a case, the outer plenum may receive hot anti-icing air F from each of the vane(s) 32. Alternatively, multiple outer plenums 50 may positioned circumferentially-adjacent one another along a circumference of the outer shroud 28. For instance, each of the multiple outer plenums 50 may receive hot anti-icing air F from adjacently-disposed respective one or more vane(s) 32. The outer plenum(s) 50 may receive hot anti-icing air F from the vane air outlet(s) 48 of each vane 32. The hot anti-icing air F may then pass through the outer plenum(s) 50 and exit via exhaust port 52.

Exhaust port 52 may include a valve (not shown) for selectively opening and closing the exhaust port 52, thereby metering the quantity of hot anti-icing air F exhausted from the outer plenum 50. This valve may be a line-replaceable unit without any piping, which may contribute to weight savings and minimize the overall complexity of the vane anti-icing system. Other sealing means for exhaust port 52 may be contemplated. In an embodiment, exhaust port 52 may be selectively sealed to control the flow of hot anti-icing air F through the vane(s) 32, as the inability of hot anti-icing air F to exit the outer plenum 50 may prevent upstream hot anti-icing air F (relative to the vane heating pathway) from entering the vane(s) 32 from the inner plenum(s) 42. In some embodiments, hot anti-icing air F may be exhausted from the outer plenum(s) 50 overboard via exhaust port 52. Alternatively, hot anti-icing air F may be exhausted from the outer plenum(s) 50 into the bypass duct 22 via exhaust port 52. In either case, as the hot anti-icing air F is directed in a radially outward direction as it anti-ices the vane(s) 32 before being exhausted in a same direction, additional ducting to redirect the hot anti-icing air F back to the main engine gas path, which may add weight and complexity to the engine 10, may not be required.

In some embodiments, additional or supplemental hot anti-icing air may be provided to anti-ice the vane(s) 32, if needed. For instance, extremely low ambient air temperatures may require additional hot anti-icing air. As shown in FIG. 2, ducting or piping 54 may direct the additional hot air from an additional, supplementary or secondary air source (not shown). Such secondary air source may be, for instance a downstream location of the engine 10 (with reference to main airflow path), for instance at an inlet or an outlet of a high pressure compressor of the compressor section 14, or from the combustor 16. Other secondary air sources may be contemplated as well. In an embodiment, the main or primary heated air source 40 is bleed air from a low pressure compressor of the compressor section 14, while the secondary or additional air source is bleed air from the high pressure compressor of the compressor section 14. In various cases, heated pressurized air can be bled from one or more sources such as the compressor section 14 and combustor 16 and directed through the engine 10 to the inner plenum 42, for instance via ducts within a hollow central engine shaft 56.

Referring to FIG. 5, a control system 100 is shown for controlling the anti-icing of the vane(s) 32. In particular, the system 100 may be used to control the quantity of hot anti-icing air F (and additional hot air, if applicable) directed to the vane(s) 32. The system 100 includes a control unit 102, which is coupled to the engine 10 as well as to one or more engine sensors 104. The control unit 102 may include a digital computer or Engine Control Unit (ECU) (not shown) using a Central Processing Unit (CPU) (not shown).

Engine sensor(s) 104 may include one or more temperature sensors for measuring air temperature at various positions within the engine 10. For instance, a temperature sensor may be disposed at the inlet 24 to compressor section 14. Other locations for temperature sensors, for instance adjacent the vane(s) 32, may be contemplated as well. Engine sensor(s) 104 may additionally include other sensors such as pressure sensors. As such, engine sensor(s) 104 may be configured for taking one or more measurements indicative of an operating condition adjacent the vane(s) 32 and reporting this condition to the control unit 102. The control unit 102 may then determine whether the reported operating condition, for instance the temperature at or near the vane(s) 32, is conducive to ice build-up on the vane(s) 32. If so, the control unit 102 may transmit instructions to the engine 10 to anti-ice the vane(s) 32. In an exemplary embodiment, the transmitted instructions may include opening the valves at the inner plenum inlet 42a at the inner plenum(s) 42 and/or the exhaust port 52 at the outer plenum(s) 50 to allow the hot anti-icing air F to flow through the vane(s) 32. In some cases, the degree to which these valves are open may be modulated based on the determined level of anti-icing required. In addition, based on the information received from the engine sensor(s) 104, control unit 102 may transmit instructions to the engine 10 to direct additional hot air to the vane(s) 32 for additional anti-icing, for instance due to extremely low ambient air temperatures. The delivery of hot anti-icing air to the vane(s) 32 may thus be controlled based on a variety of factors and may vary as said factors change, for instance throughout a given flight. Other considerations and instructions may be contemplated.

In an embodiment, the present disclosure teaches a method for anti-icing a vane 32 in an aircraft engine 10. Hot anti-icing air is directed from an inner plenum 42 disposed radially inwardly of the vane 32 through a vane air inlet 46 at a radially inner end 36 of the vane 32. The hot anti-icing air is directed in a radially-outward direction through a internal passage 44 in the vane 32 towards a vane air outlet 48 at a radially outer end 38 of the vane 32. The hot anti-icing air from the internal passage 44 in the vane 32 is directed through the vane air outlet 48 into an outer plenum 50 disposed radially outwardly of the vane 32. The hot anti-icing air is exhausted from the outer plenum 50 via an exhaust port 52.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inlet guide vane assembly for an aircraft engine, comprising:
    an array of inlet guide vanes extending between a radially inner shroud and a radially outer shroud; and
    an inlet guide vane of the array of inlet guide vanes having a radially inner end at the radially inner shroud, a radially outer end at the radially outer shroud, and an airfoil extending between the radially inner end and the radially outer end, the inlet guide vane having an internal passage extending radially through the airfoil from a vane air inlet at the radially inner end to a vane air outlet at the radially outer end, the vane air inlet in fluid communication with an inner plenum disposed radially inwardly of the inlet guide vane, the inner plenum being annular and extending about a circumference of the radially inner shroud, the inner plenum in fluid communication with an anti-icing air source via an inner plenum inlet, the vane air outlet in fluid communication with an outer plenum disposed radially outwardly of the inlet guide vane and having an exhaust port;
    wherein a vane anti-icing pathway is defined in a radially-outward direction from the inner plenum, through the internal passage of the vane and into the outer plenum.

2. The inlet guide vane assembly as defined in claim 1, wherein the internal passage extending radially through the airfoil is defined by a hollow inner cavity of the inlet guide vane.

3. The inlet guide vane assembly as defined in claim 1, wherein the airfoil is a solid-body airfoil, and the internal passage extending radially through the airfoil is defined by one or more passages formed through the solid-body airfoil.

4. The inlet guide vane assembly as defined in claim 1, wherein the exhaust port includes a valve for selectively sealing the outer plenum.

5. The inlet guide vane assembly as defined in claim 1, wherein the inlet guide vane is a variable inlet guide vane.

6. The inlet guide vane assembly as defined in claim 1, wherein each vane of the array of inlet guide vanes comprises the inlet guide vane.

7. An aircraft engine, comprising:
a compressor section having a compressor inlet, a radially inner shroud, a radially outer shroud, and a compressor rotor;
an anti-icing air source;
an inlet guide vane radially disposed between the radially inner shroud and the radially outer shroud and located upstream of the compressor rotor in the compressor section, the inlet guide vane having a radially inner end at the radially inner shroud, a radially outer end at the radially outer shroud, and an airfoil extending between the radially inner end and the radially outer end, the inlet guide vane having an internal passage extending radially through the airfoil from a vane air inlet at the radially inner end to a vane air outlet at the radially outer end;
an inner plenum disposed radially inwardly of the inlet guide vane, the inner plenum being annular and extending about a circumference of the radially inner shroud, the inner plenum in fluid communication with the internal passage via the vane air inlet and with the anti-icing air source via an inner plenum inlet; and
an outer plenum disposed radially outwardly of the inlet guide vane, the outer plenum in fluid communication with the internal passage via the vane air outlet, the outer plenum having an exhaust port.

8. The aircraft engine as defined in claim 7, wherein the internal passage extending radially through the airfoil is defined by a hollow inner cavity of the inlet guide vane.

9. The aircraft engine as defined in claim 7, wherein the airfoil is a solid-body airfoil, and the internal passage extending radially through the airfoil is defined by one or more passages formed through the solid-body airfoil.

10. The aircraft engine as defined in claim 7, wherein the exhaust port includes a valve for selectively sealing the outer plenum.

11. The aircraft engine as defined in claim 7, wherein the outer plenum is in fluid communication with a bypass duct of the aircraft engine via the exhaust port.

12. The aircraft engine as defined in claim 7, wherein the inlet guide vane is a variable inlet guide vane.

13. The aircraft engine as defined in claim 7, wherein the anti-icing air source is bleed air from a low pressure compressor of the compressor section.

14. The aircraft engine as defined in claim 7, wherein the inner plenum is in fluid communication with an additional anti-icing air source.

15. The aircraft engine as defined in claim 14, wherein the additional anti-icing air source is bleed air from a high pressure compressor of the compressor section.

16. A method for anti-icing an inlet guide vane in an aircraft engine, comprising:
directing hot anti-icing air from an inner plenum disposed radially inwardly of the inlet guide vane through a vane air inlet at a radially inner end of the inlet guide vane, the inner plenum being annular and having an inner plenum inlet in fluid communication with a source of the hot anti-icing air;
directing the hot anti-icing air in a radially-outward direction through an internal passage within the inlet guide vane, from the vane air inlet at the radially inner end of the inlet guide vane towards a vane air outlet at a radially outer end of the inlet guide vane;
directing the hot anti-icing air through the vane air outlet at the radially outer end of the inlet guide vane into an outer plenum disposed radially outwardly of the inlet guide vane; and
exhausting the hot anti-icing air from the outer plenum via an exhaust port.

17. The method as defined in claim 16, further comprising bleeding the hot anti-icing air from a compressor of the aircraft engine and directing the hot anti-icing air into the inner plenum.

18. The method as defined in claim 16, wherein directing the hot anti-icing air in the radially-outward direction through the internal passage within the inlet guide vane includes directing the hot anti-icing air through a hollow inner cavity of the inlet guide vane.

19. The method as defined in claim 16, wherein exhausting the hot anti-icing air from the outer plenum includes exhausting the hot anti-icing air from the outer plenum to a bypass duct of the aircraft engine via the exhaust port.

20. The method as defined in claim 16, wherein exhausting the hot anti-icing air from the outer plenum includes exhausting the hot anti-icing air overboard via the exhaust port.

* * * * *